United States Patent [19]

Kawanishi

[11] 4,444,282

[45] Apr. 24, 1984

[54] COMBINATION WEIGHING DEVICE

[75] Inventor: Shozo Kawanishi, Kobe, Japan

[73] Assignee: Yamato Scale Company, Ltd., Hyogo, Japan

[21] Appl. No.: 367,369

[22] Filed: Apr. 12, 1982

[30] Foreign Application Priority Data

Apr. 15, 1981 [JP] Japan .................................. 56-57487

[51] Int. Cl.³ .......................................... G01G 19/22
[52] U.S. Cl. ..................................................... 177/25
[58] Field of Search ........................................... 177/25

[56] References Cited

U.S. PATENT DOCUMENTS

| | | | |
|---|---|---|---|
| 2,470,916 | 5/1949 | Carruthers | 177/25 X |
| 2,802,658 | 8/1957 | Hensgen et al. | 177/25 X |
| 4,123,970 | 11/1978 | Quante | 177/25 X |
| 4,308,928 | 1/1982 | Oshima | 177/25 |

*Primary Examiner*—George H. Miller, Jr.
*Attorney, Agent, or Firm*—Eugene E. Geoffrey, Jr.

[57] ABSTRACT

A combination weighing device with a simplified structure, which is used for packing a predetermined weight of articles in each package and especially useful with manual loading and unloading operations, arranged such that the articles are loaded successively on a single weighing unit and then unloaded on to a plurality of receptacles, the weights of the articles are successively stored in memory locations corresponding to the receptacles, the memory contents are successively read out in accordance with predetermined combinations by an arithmetic unit which selects a combination having a total weight which falls within a predetermined range, and the selected combination of the receptacles is indicated by an indicator for collecting the articles therein in a package.

1 Claim, 1 Drawing Figure

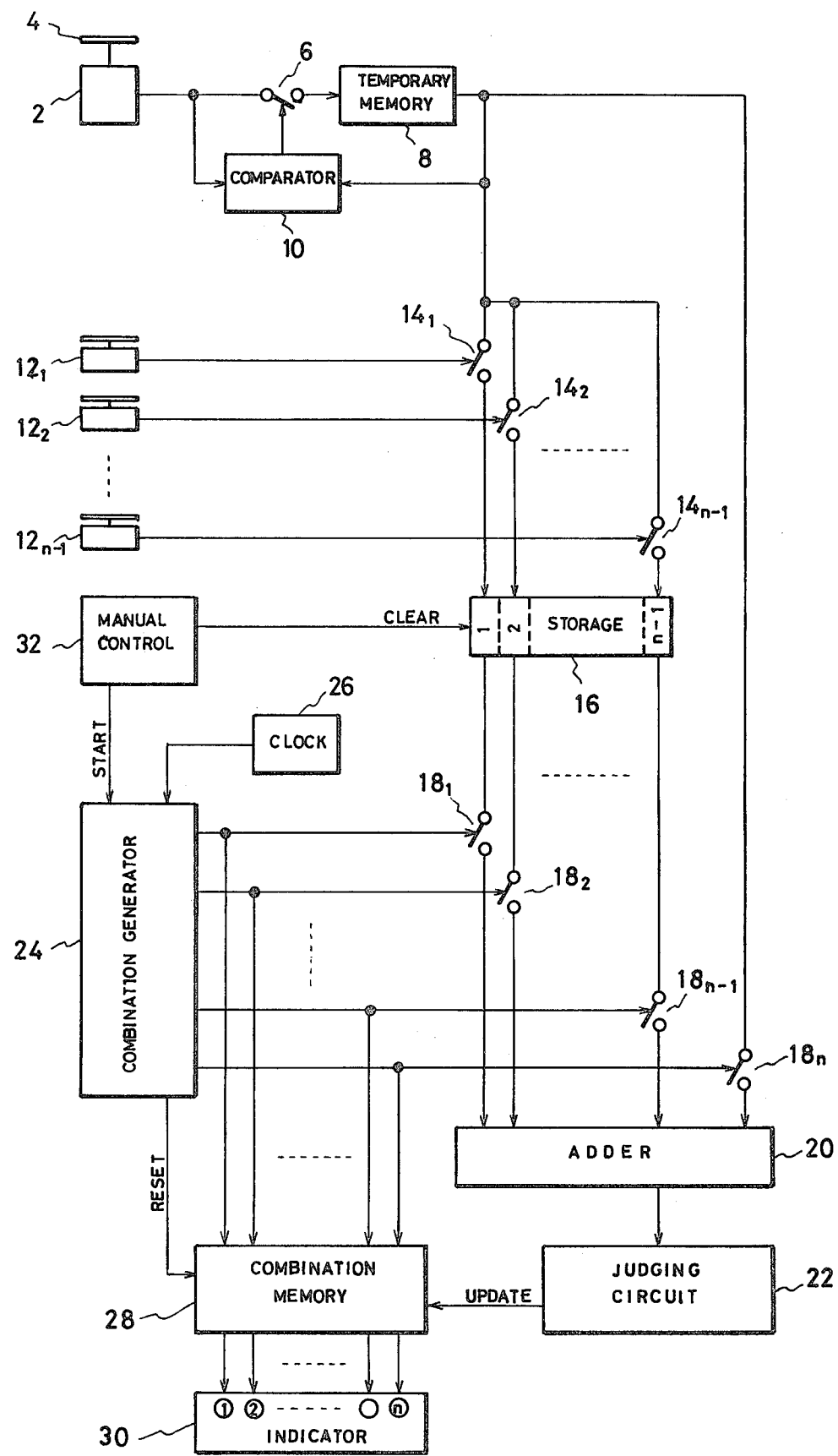

COMBINATION WEIGHING DEVICE

This invention relates to a combination weighing device used for packing a predetermined weight of articles in each pack and, especially, to such a device which is economical in structure and conveniently used with manual loading and unloading operations.

The weighing device which is generally referred to as a "combination balance" or "combination weighing device" is used for extracting and collecting some articles from a large group of articles, such as cakes, fish and vegetables, having relatively large variance of weights, so that the extracted group has a weight meeting a predetermined condition. A typical example of such a device is disclosed in U.S. Pat. No. 4,267,894. In that device, the articles are weighed individually by a plurality of weighing balances at the same time. All mathematical combinations of the respective weights are summed and the respective sums are subtracted from a predetermined target weight to obtain corresponding deviations. Thus, the combination providing the least deviation is selected for use.

However, that device must be provided with a plurality of weighing balances which are relatively expensive and troublesome in maintenance. Moreover, it will be understood that the number of balances must be increased in order to decrease the deviation of weight of the selected combination. U.S. Pat. No. 4,308,928 discloses an improved combination weighing device provided for overcoming this problem. That device has a single weighing unit and a plurality of retaining hoppers and corresponding memories. The articles are automatically loaded on the balance and unloaded into the retaining hoppers and their weights are written in the corresponding memories successively in periodic fashion. When all the retaining hoppers are filled with articles, the memories are read out and the abovementioned combination and arithmetic operations are started. However, that device is relatively large-scaled and complicated in mechanical structure and uneconomical and inconvenient for use when relatively small and few articles are handled especially in manual fashion.

Accordingly, an object of this invention is to provide an improved combination weighing device which has a few weighing units accompanied with a number of memories but may have no mechanical loading and unloading means and, therefore, can enjoy the advantages of the above-cited prior art devices with no costly exaggerated mechanical structure.

In accordance with a feature of this invention, a combination weighing device is provided having a single weighing unit for weighing articles and producing corresponding weight representative signals, successively, and a storage device with a plurality of storage locations. The output of the weighing unit is coupled through a temporary memory and a plurality of parallel normally-open switches to the respective storage locations of the storage device. The control terminals of the normally-open switches are coupled to corresponding article receptacles which are designed to close the switches in response to the articles put thereon. The outputs of the respective storage locations are coupled to combination control and arithmetic circuits which are similar to those of the prior art devices.

The accompanying single drawing shows a block diagram representing a circuit arrangement of an embodiment of the combination weighing device according to this invention.

In the drawing, an electronic weighing unit 2 having a weighing cradle 4 is provided for producing an electric signal indicative of the weight of the article on the cradle 4. The weight indicative output signal of the unit 2 is coupled via a normally-open switch 6 to a temporary memory 8. The outputs of the weighing unit 2 and memory 8 are coupled respectively to first and second inputs of a comparator 10, the output of which is coupled to a control terminal of the switch 6. The comparator 10 is designed to produce an output only when the first input is greater than the second input significantly, for example, by the weight of the article, thereby closing the switch 6 only when the memory 8 is vacant, in order to prevent disturbance of the memory content.

The output of the temporary memory 8 is coupled through normally-open switches $14_1$, $14_2$, ... $14_{n-1}$ to storage locations 1, 2, ... n-1 of a storage device 16. A plurality of article receptacles $12_1$, $12_2$, ... $12_{n-1}$ are coupled to control terminals of the switches $14_1$, $14_2$, ... $14_{n-1}$, respectively, and designed to close the respective switches when articles are put thereon. The receptacles may be signal generators which provide control signals to the switches in response to the articles thereon, or may be the switches $14_1$, $14_2$, ... $14_{n-1}$ themselves which are arranged to be closed by the weights of the articles.

The outputs of the respective storage locations of the storage device 16 are coupled respectively through normally-open switches $18_1$, $18_2$, ... $18_{n-1}$ to an adder circuit 20, the output of which is coupled to a judging circuit 22. The adder 20 has another input coupled through a normally-open switch $18_n$ to the output of the temporary memory 8. The adder 20 serves to sum the input weight indicative signals and apply a sum signal to the judging circuit 22. The judging circuit 22 is designed, in this embodiment, to produce an update signal every time when the input sum signal is judged closer to a predetermined target value than the former one. A detailed description of the judging circuit 22 is disclosed in the aforementioned U.S. Pat. No. 4,267,894 and U.S. patent application Ser. No. 323,951 filed Nov. 23, 1981.

The combination generator 24 has a plurality of outputs coupled respectively to control terminals of the switches $18_1$, $18_2$, ... $18_{n-1}$ for closing them. As described in detail in the above-cited United States patents, the combination generator 24 in this embodiment is a n-bit binary counter clocked by a clock pulse generator 26 and the outputs thereof are the parallel outputs of the counter. During each cycle of counting operation, the combination generator 24 produces $(2^n - 1)$ sets of combinations of the outputs and closes the switches $18_1$, $18_2$, ... $18_n$ successively in accordance with these combinations. The combination generator 24 is arranged to produce a reset signal at the end of each cycle of operation. The outputs of the combination generator 24 are also coupled to the inputs of a combination memory 28. The combination memory 28 is designed to update its content with the current inputs in response to the update signal from the judging circuit 22 and supply the content concurrently to an indicator 30 in response to the reset signal from the combination generator 24. The indicator 30 has a plurality of tally lamps corresponding to the receptacles $12_1$, $12_2$, ... $12_{n-1}$ and the weighing unit 2, respectively, which are actuated by the outputs of the combination memory 28 to indicate those selected by the judging circuit 22.

A manual control device 32 having a push-button switches is provided for applying a start signal to the combination generator to start its operation and a clear signal to the storage 16 to clear it at the end of operation. The storage 16 may be arranged to be cleared by the reset signal from the combination generator 24.

In operation, an article is put on the cradle 4 of the weighing unit 2. Assuming first that the temporary memory 8 is vacant, the first input of the comparator 10 is greater than the second input and the comparator 10 produces an output to close the switch 6. Accordingly, the output signal indicative of the article weight is written in the memory 8. Then, the article is transferred from the cradle 4 to the first receptacle $12_1$. When the article has been removed from the cradle 4, the first input of the comparator 10 becomes less than the second input and the comparator 10 stops its output to open the switch 6, thereby preventing the content of the memory 8 from being disturbed by any false input otherwise coming therein. When the article is put on the receptacle $12_1$, the corresponding switch $14_1$ is closed and the content of the memory 8, which is indicative of the weight of the article, is written in the first storage location (1) of the storage device 16. Now, the memory 8 is vacant. Next, putting the second article on the cradle 4, its weight indicative signal is stored in the memory 8 the same as in the case of the first article. Transferring the article from the cradle 4 to the second receptacle $12_2$, the switch $14_2$ is closed to pass the content of the memory 8 to the second storage location (2) of the storage device 16. When, repeating similar procedure, the (n−1)th article is put on the receptacle $12_{n-1}$, all the locations of the storage device 16 are filled with the weight data of the articles on the receptacles $12_1$, $12_2$, . . . $12_{n-1}$. Thereafter, another article is put on the cradle 4 to write its weight data in the memory 8.

If the manual control device 32 is actuated to produce a start signal, the combination generator 24 initiates its operation and the known combination and arithmetic arrangement 18, 20, 22, 24, 26 and 28 executes known operation and the combination memory 28 will store a combination information which provides a sum weight meeting the preset condition in the judging circuit 22, at the end of the operation cycle of the combination generator 24. The content of the memory 28 is applied to the indicator 30 in response to the reset signal from the combination generator 24 and the indicator indicates the receptacles and the cradle 4 belonging to the selected combination. Then, the operator can collect the articles on the indicated receptacles in a pack.

It should be noted that the above-described embodiment has been presented only for explanatory purposes and various modifications and changes can be made within the scope of this invention as defined in the appended claims. For example, instead of the output of the temporary memory 8, the output of the weighing unit 2 may be directly coupled to the switch $18_n$. The cradle 4 need not always participate in the combinations. The article sensing means of each receptacle may be of any type, such as mechanical, optical, etc. The storage locations of the single storage device 16 may be discrete memories. The article loading, transferring and unloading operations may be fully or partially automatic. Furthermore, it is also possible to provide a plurality of the arrangements each including the components 2, 4, 6, 8, 10, 12 and 14 and couple the outputs of all the switches 14 to a common storage device 16 having corresponding storage locations.

What is claimed is:

1. A combination weighing device, comprising at least one weighing unit for weighing a product and producing an output signal indicative of the weight of said product, a plurality of receptacles for holding the products weighed by said weighing unit, a plurality of memories corresponding respectively to said receptacles for storing the measured weights, a combination logic circuit coupled to the outputs of said plurality of memories for suitably combining some of the contents of said memories to select a combination having a sum weight meeting a predetermined condition, and means for allotting the output of said weighing unit to said memories, said allotting means including a first normally-open switch and a temporary memory connected in series to the output of said weighing unit, a comparator for comparing the input signal of said normally-open switch and the output signal of said temporary memory and producing an output signal to close said normally open switch when the former is greater than the latter to record said weight in said temporary memory, and a plurality of second normally-open switches coupled between the output of said temporary memory and the inputs of said plurality of memories, respectively, and each of said receptacles including means for responding to the product put thereon to close the corresponding one of said second normally-open switches to feed the contents of said temporary memory to one of said plurality of memories.

* * * * *